US009754752B2

(12) United States Patent
Papenbreer et al.

(10) Patent No.: US 9,754,752 B2
(45) Date of Patent: Sep. 5, 2017

(54) AUTO DETECTION OF GUARD LOCKING DEVICE

(71) Applicant: Rockwell Automation Germany GmbH & Co. KG, Wuppertal (DE)

(72) Inventors: Rudolf Papenbreer, Wuppertal (DE); Sascha Wagner, Gevelsberg (DE); Thomas Helpenstein, Grevenbroich (DE); Oliver Heckel, Frechen (DE); Norbert Machuletz, Wetter (DE)

(73) Assignee: Rockwell Automation Germany GMBH & Co. KG (DE)

( * ) Notice: Subject to any disclaimer, the term of this patent is extended or adjusted under 35 U.S.C. 154(b) by 672 days.

(21) Appl. No.: 14/264,734

(22) Filed: Apr. 29, 2014

(65) Prior Publication Data

US 2014/0319928 A1    Oct. 30, 2014

(30) Foreign Application Priority Data

Apr. 29, 2013   (EP) .................................... 13165758

(51) Int. Cl.
  *H01H 69/01*   (2006.01)
  *H01H 71/04*   (2006.01)
  (Continued)

(52) U.S. Cl.
  CPC ......... *H01H 71/04* (2013.01); *G05B 19/0428* (2013.01); *H01H 47/002* (2013.01);
  (Continued)

(58) Field of Classification Search
  CPC .... H01H 69/01; H01H 71/04; G05B 19/0428; F16P 3/00; F16P 3/003
  (Continued)

(56) References Cited

U.S. PATENT DOCUMENTS

| | | | | |
|---|---|---|---|---|
| 2003/0030330 | A1* | 2/2003 | Pullmann | G05B 9/03 307/328 |
| 2004/0160131 | A1* | 8/2004 | Veil | F16P 3/00 307/116 |
| 2006/0255786 | A1* | 11/2006 | Schwenkel | H01F 7/1844 323/284 |

FOREIGN PATENT DOCUMENTS

| | | |
|---|---|---|
| DE | 102005048601 B3 | 4/2007 |
| EP | 1321952 A1 | 6/2003 |
| EP | 2362408 A1 | 8/2011 |

OTHER PUBLICATIONS

European Search Report; Application No. 13165758.7; Dated Feb. 10, 2013—(5) pages.

* cited by examiner

*Primary Examiner* — Rexford Barnie
*Assistant Examiner* — Thai Tran
(74) *Attorney, Agent, or Firm* — Boyle Fredrickson, SC (57) ABSTRACT

A safety switching device for driving a plurality of different kinds of guard locking devices is provided. The safety switching device comprises a first terminal and a second terminal for connecting a guard locking device, and a safety processor adapted for controlling drive signals at the first and the second terminal to drive the guard locking device. The safety processor is adapted for determining a kind of a guard locking device connected to the first and/or the second terminal out of a plurality of different kinds of guard locking devices by detecting external electrical connections between the first terminal, the second terminal, and a reference potential. The safety processor is further adapted for controlling the drive signals depending on the determined kind of the guard locking device.

13 Claims, 4 Drawing Sheets

(51) Int. Cl.
    *H01H 47/00*     (2006.01)
    *G05B 19/042*     (2006.01)
    *H01H 3/02*     (2006.01)

(52) U.S. Cl.
    CPC ............. *H01H 69/01* (2013.01); *H01H 3/022* (2013.01); *H01H 47/004* (2013.01); *Y10T 307/747* (2015.04)

(58) Field of Classification Search
    USPC ........................................................ 307/115
    See application file for complete search history.

AUTO DETECTION OF GUARD LOCKING DEVICE

CROSS-REFERENCE TO RELATED APPLICATIONS

This application claims priority to European patent application No. 13 165 758.7, filed Apr. 29, 2013, the entire contents of which is incorporated herein by reference.

BACKGROUND OF THE INVENTION

The subject matter disclosed herein relates generally to switching devices and, more specifically, to safety switching devices for controlling guard locking devices. The present invention relates to safety switching devices capable of controlling a plurality of different kinds of guard locking devices and to a method for determining, by a safety switching device, which kind of a guard locking device is connected thereto.

Safety switching devices are, for instance used in industrial production environments in order to reliably and safely disconnect machines, such as a hydraulic press or a milling machine, if this is necessary for the safety of personnel or machinery. Safety switching devices typically have one or more input terminals to which input devices such as emergency stop buttons, two-hand operator buttons, guard door switches or light curtains can be connected. An evaluation and control unit evaluates the input signal from these input devices in a fail-safe manner and produces a switching signal on an output side being a function of same. The evaluation and control unit is also designed to operate in a fail-safe manner, for instance by providing redundancy. The switching signal controls actuators, in particular contactors for disconnecting the machine from a power supply and guard locking devices for locking/unlocking a movable guard such as a guard door.

The term "fail-safe" signifies that disconnecting the machine or locking the guard door must be ensured under all circumstances, even if a functional fault occurs within the chain comprising the input device, the safety switching device and the actuator. Safety switching devices must therefore be designed such that they ensure that the machine being monitored is always in a safe state, even in the event of the failure of one component, in the case of broken cables or other malfunctions. Accordingly, the term "safety switching device" in this context refers in particular to those devices and appliances which comply at least with category 3 of European standard EN 954-1, or comparable requirements.

Depending on the specific production environment, safeguards may be mandatory for controlling access to potentially harmful areas. In order to allow servicing personal to access these areas under certain conditions, guards or part of the guards may be moveable. Movable guards may be monitored with guard switches, for instance, to disconnect machines behind the guard when the guard is opened. Moreover, movable guards may be locked in the closed position by means of guard locking devices. In a safety application, safety switching devices may be employed for controlling and coordinating the processes of monitoring sensors (emergency buttons, guard switches, etc.), disconnecting machines, and unlocking corresponding guards.

For most types of guard locking devices, the unlocking action is conditional on the receipt of a certain electrical signal. However, guard locking devices may differ with respect to the kind of electrical signal required for performing the locking/unlocking action. Conventional guard locking devices require an electrical voltage to energize a lock release solenoid. More advanced guard locking device have an integrated safety circuit for controlling their operation and for implementing a fail-safe connection between the safety switching device and the guard locking device. The integrated safety circuit may regularly check the input signal(s) in order to detect a fault condition and to ensure that the guard lock is in a safe status when a fault occurs. Specifically, guard locking devices may be provided with OSSD (output signal switching device) terminals in order to allow for cross-wire or short-circuit fault detection. During regular operation, both OSSD signal lines deliver a DC voltage, such as 24 V. In certain time intervals, test impulses are modulated onto the DC voltage in order to detect a cross-wire or short-circuit fault. If a fault is detected, both signal lines are turned off.

A fail-safe connection between the safety switching device and the guard locking device may also be achieved by transmitting a dynamic signal on a single wire connection (single wire safety). The dynamic signal may be a clocked digital signal comprising a train of predefined pulses. Any deviation from the predefined pulse train, i.e., an invalid signal, indicates a connection fault, causing the guard locking device to return to or to remain in the safe status. Further details on implementing a fail-safe connection between two safety units by means of a single channel can be found in reference EP 2 383 762 A1, which is herewith incorporated in its entirety.

BRIEF DESCRIPTION OF THE INVENTION

Given the plurality of different kinds of guard locking devices requiring different kinds of input signals, there is the problem that a corresponding plurality of different safety switching devices is required, each of which is specialized for driving only a very limited number of guard locking devices.

Thus, it would be desirable to provide a safety switching device that is capable of driving a plurality of different kinds of guard locking devices.

According to one embodiment of the present invention a safety switching device is capable of determining, during a configuration phase after start-up, what kind of guard locking device is connected and to configure its output terminals accordingly. The determination is performed by probing the external connectivity of these terminals in order to discern guard locking devices with a solenoid, guard locking devices with a single wire safety input, and guard locking devices with dual channel safety input.

According to a first aspect of the present invention, a safety switching device for driving a plurality of different kinds of guard locking devices is provided. The safety switching device comprises a first terminal and a second terminal for connecting a guard locking device and a safety processor adapted for controlling drive signals at the first and the second terminal to drive the guard locking device. The safety switching device is characterized in that the safety processor is adapted for determining a kind of a guard locking device connected to the first and/or the second terminal out of a plurality of different kinds of guard locking devices by detecting external electrical connections between the first terminal, the second terminal, and a reference potential, and for controlling the drive signals depending on the determined kind of the guard locking device, wherein said plurality of different kinds of guard locking devices comprises a first kind of guard locking devices having a solenoid, a second kind of guard locking devices having a single channel logic input, and a third kind of guard locking devices having dual channel safety inputs.

Preferably, each of the first and the second terminal is operable as an input terminal and an output terminal. In a preferred embodiment the safety switching device further comprises a switching circuitry for selectively connecting each of the first terminal and the second terminal to a first reference potential (e.g. ground) or to a second reference potential (e.g. positive supply voltage) or to neither the first nor the second reference potential, wherein the safety processor is adapted for controlling the switching circuitry and for monitoring a potential at each of the first terminal and the second terminal. In this manner, each terminal may be connected to positive supply voltage, be connected to negative supply voltage (ground), or be put into a high-impedance state (neither connected to the positive nor to the negative supply voltage). The electrical potential at each of these terminals may be constantly monitored by the safety processor. Thus, the first and the second terminal of the safety switching device have a characteristics similar to the tri-state logic as it is commonly known from digital electronics.

In a preferred embodiment, the safety processor is adapted for determining that a guard locking device of the first kind is connected to the first and the second terminal if a connection between the first terminal and the second terminal is detectable, that a guard locking device of the second kind is connected to the second terminal if a connection between the second terminal and the reference potential is detectable, and that a guard locking device of the third kind is connected to the first and the second terminal if neither a connection between the first terminal and the second terminal nor a connection between the second terminal and the reference potential is detectable. In this manner three different kinds of guard locking devices can reliably be discriminated with a minimum number of tests.

Several tests may be employed by the safety processor for probing for the presence of external electrical connections. For instance, a connection between the first terminal and the second terminal may be detected by configuring one of the first and the second terminal as an input terminal and the other one of the first and the second terminal as an output terminal, applying a test pulse at the output terminal, and determining whether the test pulse is detectable at the input terminal. The test pulse may be considered as being detectable at the input terminal if one or more edges have been detected at the input terminal or if the potential at the input terminal corresponds to the potential during the test pulse at the output terminal.

Further, a connection between either one of the first and the second terminal and the reference potential may be detected by configuring the either one of the first and the second terminal as an input terminal, and determining whether a logic level corresponding to the reference potential is detectable at the input terminal. Suitable pull-up or pull-down resistors may be provided at the terminals of the safety switching device in order to ensure well-defined potentials at these terminals if no such external connection exists.

According to a preferred embodiment, the safety processor is adapted for determining the kind of guard locking device during a configuration phase after start-up of the safety switching device. The configuration phase may be entered after start-up only if certain user input is provided in order to prevent accidental re-configuration. The result of the determination during the configuration phase may be stored as part of a configuration that is to be used during regular operation. The configuration may, for instance, determine how the first and the second terminal are to be configured for regular operation, depending on the kind of guard locking device connected to the safety switching device.

Specifically, the safety processor may be adapted for configuring and/or operating the first terminal as a high-side switch and the second terminal as a low-side switch for driving a guard locking device of the first kind. Further, the safety processor may be adapted for configuring and/or operating the second terminal as a logic output for driving a guard locking device of the second kind. Finally, the safety processor may be adapted for configuring and/or operating the first terminal and the second terminal as OSSD output terminals for driving a guard locking device of the third kind.

In certain embodiments, the safety switching device may further comprise one or more additional terminals for receiving a switching signal from a safety input device. The safety processor may be further adapted for monitoring the switching signal and for driving the guard locking device depending on the switching signal. This allows the safety switching device to be employed in a broad range of different application scenarios, such as emergency stop applications, guard door monitoring, slow-speed monitoring, and others.

According to a further aspect of the present invention, a method is provided for determining, by a safety switching device having a first terminal and a second terminal for connecting a guard locking device, which kind of a guard locking device is connected to the first terminal and/or the second terminal. The method comprises the steps of probing for the presence of external electrical connections between the first terminal, the second terminal, and a reference potential, and determining a kind of the guard locking device connected to the first and/or the second terminal out of a plurality of different kinds of guard locking devices on the basis of a result of the probing step, wherein said plurality of different kinds of guard locking devices comprises a first kind of guard locking devices having a solenoid, a second kind of guard locking devices having a single channel logic input, and a third kind of guard locking devices having dual channel safety inputs.

In a preferred embodiment, it is determined that a guard locking device of the first kind is connected to the first and the second terminal if a connection between the first terminal and the second terminal is detectable in the probing step. Further, it is determined that a guard locking device of the second kind is connected to the second terminal if a connection between the second terminal and the reference potential is detectable in the probing step. Finally, it is determined that a guard locking device of the third kind is connected to the first and the second terminal if neither a connection between the first terminal and the second terminal nor a connection between the second terminal and the reference potential is detectable in the probing step. In this manner three different kinds of guard locking devices can reliably be discriminated with a minimum number of tests.

The method may use any suitable test for probing for external electrical connections. Preferably, the probing step comprises detecting a connection between the first terminal and the second terminal by configuring one of the first and the second terminal as an input terminal and the other one of the first and the second terminal as an output terminal, applying a test pulse at the output terminal, and determining whether the test pulse is detectable at the input terminal. In this manner, a connection between the first and the second terminal, as it may be embodied by the solenoid of a guard locking device, can reliably be detected.

Further, the probing step preferably comprises detecting a connection between either one of the first and the second terminal and the reference potential by: configuring the either one of the first and the second terminal as an input terminal, and determining whether a logic level corresponding to the reference potential is detectable at the input terminal. In this manner, a connection between the first or the second terminal and the reference potential, as it may be embodied by the digital input of a guard locking device, can reliably be detected.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The invention is now described with reference to the drawings, wherein like reference numerals are used to refer to like elements throughout. In the following description, for purposes of explanation, numerous specific details are set forth in order to provide a thorough understanding thereof. It may be evident, however, that the invention can be practiced without these specific details. In other instances, well known structures and devices are shown in block diagram form in order to facilitate a description thereof.

Figure 1:
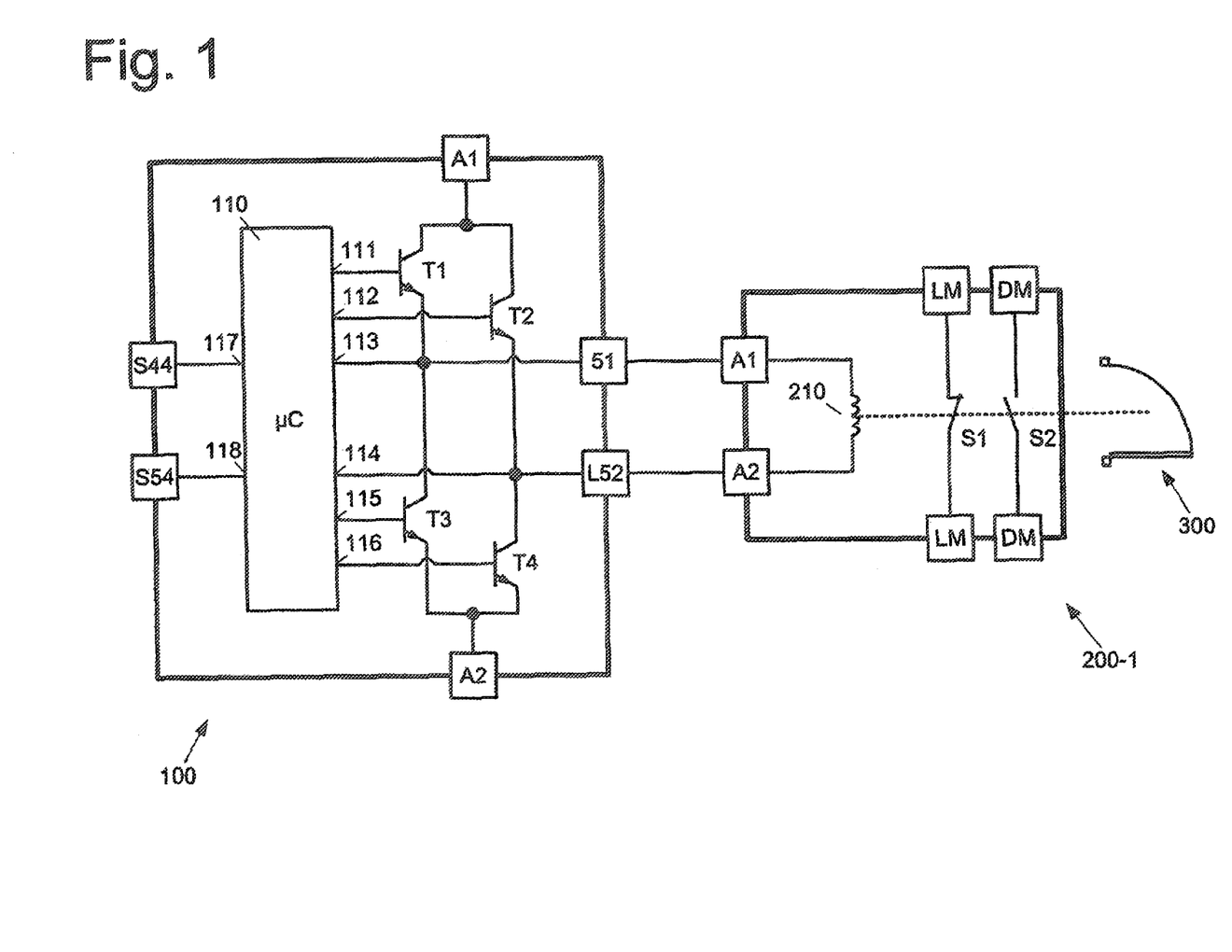
FIG. 1 shows a schematic representation of a safety switching device according to an embodiment of the present invention with a first kind of guard locking device connected thereto.
Figure 2:
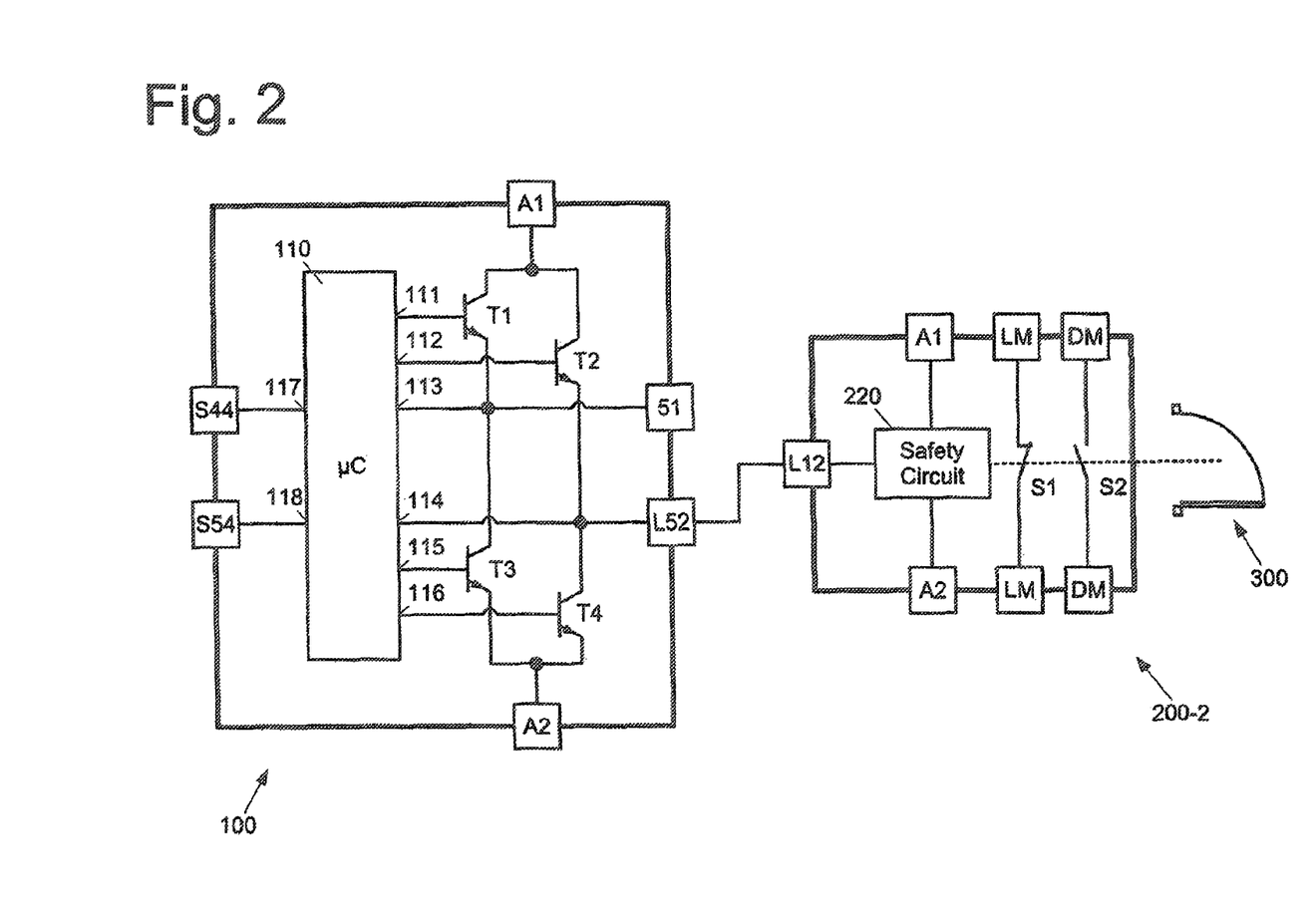
FIG. 2 shows a schematic representation of the safety switching device of FIG. 1 with a second kind of guard locking device connected thereto.
Figure 3:
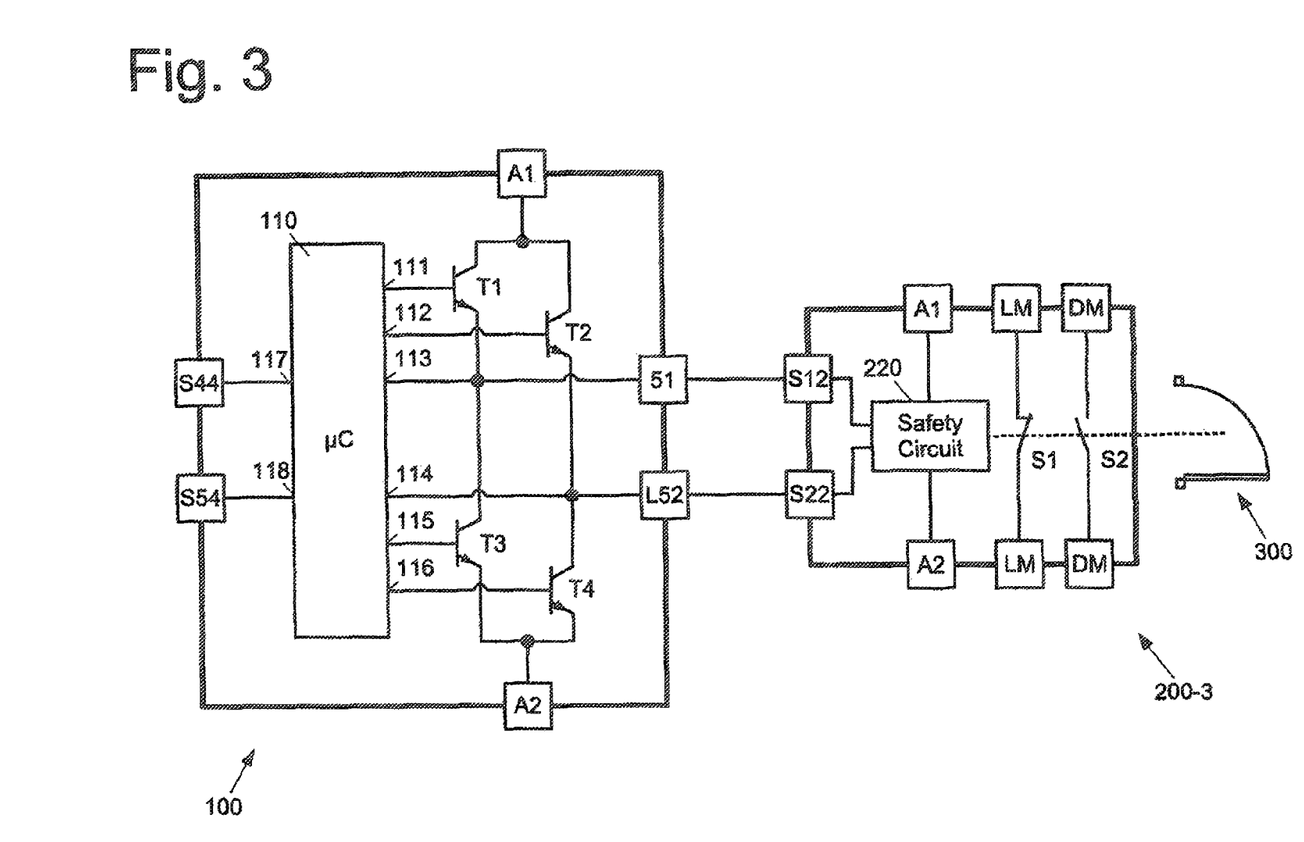
FIG. 3 shows a schematic representation of the safety switching device of FIG. 1 with a third kind of guard locking device connected thereto.

Referring now to FIGS. 1 to 3, the configuration of a safety switching device according to an embodiment of the present invention is described. The safety switching device, commonly referred to by reference number 100, comprises a safety processor 110, switching transistors T1-T4, and terminals 51, L52 for connecting a guard locking device 200. The safety switching device comprises additional terminals A1, A2 for connecting a supply voltage, as well as terminals S44, S54 for receiving input switching signals, such as signals for a lock/reset request and for an unlock request, respectively. In particular embodiments, the safety switching device may also comprise further terminals for receiving additional switching signals, in particular signals representing the speed of a machine or a feedback signal from the guard locking device 200 or another safety switch.

The switching transistors T1-T4 form a switching circuit for connecting each of the terminals 51 and L52 to either one of terminals A1 and A2. Terminals 51 and L52 may also be isolated from A1 and A2 by turning all transistors off. Transistors T1-T4 may be controlled by the safety processor 110 via output ports 111, 112, 115, and 116. Generally, transistors T1 and T3 (as well as transistors T2 and T4) will not be turned on at the same time if positive and negative supply voltage is to be applied at A1 and A2. Moreover, signals at terminals 51 and L52 may be monitored by the safety processor 110 via input ports 113 and 114. Hence, the exemplary switching circuitry T1-T4 in FIGS. 1-3 allows the safety processor to configure each of terminals 51 and L52 to operate as either one of a high-side switch (T3/T4 off), a low-side switch (T1/T2 off), and an input terminal (T1&T3/T2&T4 off).

A person skilled in the art will appreciate that FIGS. 1-3 show only a schematic representation of the safety switching device 100 and the guard locking device 200. In particular, all components not directly relevant to the present invention have been omitted for the sake of clarity, including protective electronic components, filters, power supply lines, etc. Also, the switching circuitry depicted in FIGS. 1-3 with four non-transistors is by way of example only. Switching transistors T1-T4 may be any suitable type of transistors, including bipolar transistors (e.g., npn or pnp) and field effect transistors (e.g. power-CMOS transistors).

The safety switching device 100 may be connected with different kinds of a guard locking device 200-1, 200-2, 200-3 for locking and unlocking a moveable guard, such as a guard door 300. The guard locking devices 200-1, 200-2, 200-3 differ with respect to the kind of drive signal required for initiating the locking/unlocking operation. The safety switching device 100 is capable of detecting which kind, of guard locking device is connected thereto and of configuring its output terminals 51 and L52 as well as its mode of operation accordingly. A method for detecting the kind of guard locking device connected to the safety switching device will be explained further below in connection with FIG. 4.

Referring now first to FIG. 1, the configuration of a first kind of guard locking device is described. The guard locking device 200-1 comprises an actuator solenoid 210 for locking/unlocking a moveable guard (guard door) 300. The guard locking device may further comprise one or more switches S1 for monitoring the lock/unlock status (terminals LM), as well as one or more switches S2, which are positively driven by movable guard 300, for monitoring the status of the guard door (opened/closed; terminals DM) and providing a feedback to the safety switching device 100 or another safety unit.

During operation, the safety switching device 100 may control the guard locking device 200-1 by energizing and de-energizing the solenoid 210. To this end, the safety processor 110 is monitoring input signals, e.g. input signals at terminals S44 and S54, and controlling output terminals 51 and L52 accordingly. For example, if the input signals represent a condition in which the guard is to be locked, both terminals 51 and L52 may be inactivated by turning off switching transistors T1-T4. On the other hand, if the input signals represent a condition in which the guard is to be unlocked, positive and negative supply voltage may be applied to terminals 51 and L52, respectively, by turning on transistors T1 and T4 and turning off transistors T2 and T3. In other words, terminal 51 is operated as a high-side switch and terminal L52 is operated as a low-side switch in order to energize and de-energize the solenoid 210. The safety switching device may also comprise timers for unlocking the guard with a predefined delay, for example only a certain predefined time after a machine is de-energized in order to account for machine run-down time.

Referring now to FIG. 2, the configuration of a second kind of guard locking device is described. The guard locking device 200-2 differs from that of FIG. 1 in that it comprises a safety circuit 220 for locking/unlocking the guard. The locking/unlocking operation is performed depending on a logic signal applied at logic input L12. To this end, the safety circuit 220 monitors the signal at terminal L12 and initiates the unlocking operation only if the correct signal is detected. Fail-safe behavior can be implemented with a single connection between the safety switching device 100 and the guard locking device 200-2 by employing the single-wire safety technology, as described above.

During operation, the safety switching device 100 employs switching transistors T2 and T4 to generate a suitable logic signal at terminal L52, for instance, by alternately connecting terminal L52 to a positive supply voltage at A1 and a negative supply voltage (ground) at A2. Terminal 51 is not used (T1 and T3 off). The logic signal may for instance, be a pulse train that differs from clock signals used elsewhere in the system. Thus, the logic signal represents a unique code that may be detected by the guard locking device 200-2. The guard locking device 200-2, on the other hand, will perform the unlocking operation only if the correct code is detected at its input terminal L12.

Referring now to FIG. 3, the configuration of a third kind of guard locking device is described. The guard locking device 200-3 differs from that of FIG. 2 in that it employs a dual channel safety input (OSSD input) for receiving the lock/unlock command signal.

During operation, the safety switching device 100 employs its switching circuitry T1-T4 for generating a pair of output signals at its terminals 51 and L52 in a manner similar to that of a conventional output signal switching device (OSSD). More specifically, the safety switching device 100 turns on transistors T1 and T2 and turns off transistors T3 and T4 in order to output a positive supply voltage (e.g. 24V DC) at terminals 51 and L52 if the guard may enter or remain in the unlocked state. A cross-fault or a short-circuit may be detected, as it is generally known in the art, by modulating the two channels independently of each other with short pulses. The modulation may also be performed at the safety switching device 100 by controlling ports 111, 112, 115, 116 of the safety processor 110 accordingly.

At the side of the guard locking device 200-3, the safety processor 220 monitors the signals of the two channels at input terminals S12 and S22 and initiates the locking/unlocking operation depending on these signals. Specifically, if a positive voltage (e.g. 24V DC) is applied to both terminals S12 and S22, the guard 300 may be unlocked or remain in the unlocked state. Otherwise, the guard 300 will be locked or remain in the locked state. The safety circuit 220 may also monitor test pulses on both signals in order to detect a cross-fault or a short-circuit. If a fault is detected by the safety circuit 220, the guard locking device 200-3 may enter the safe state, i.e., lock the guard 300.

Figure 4:
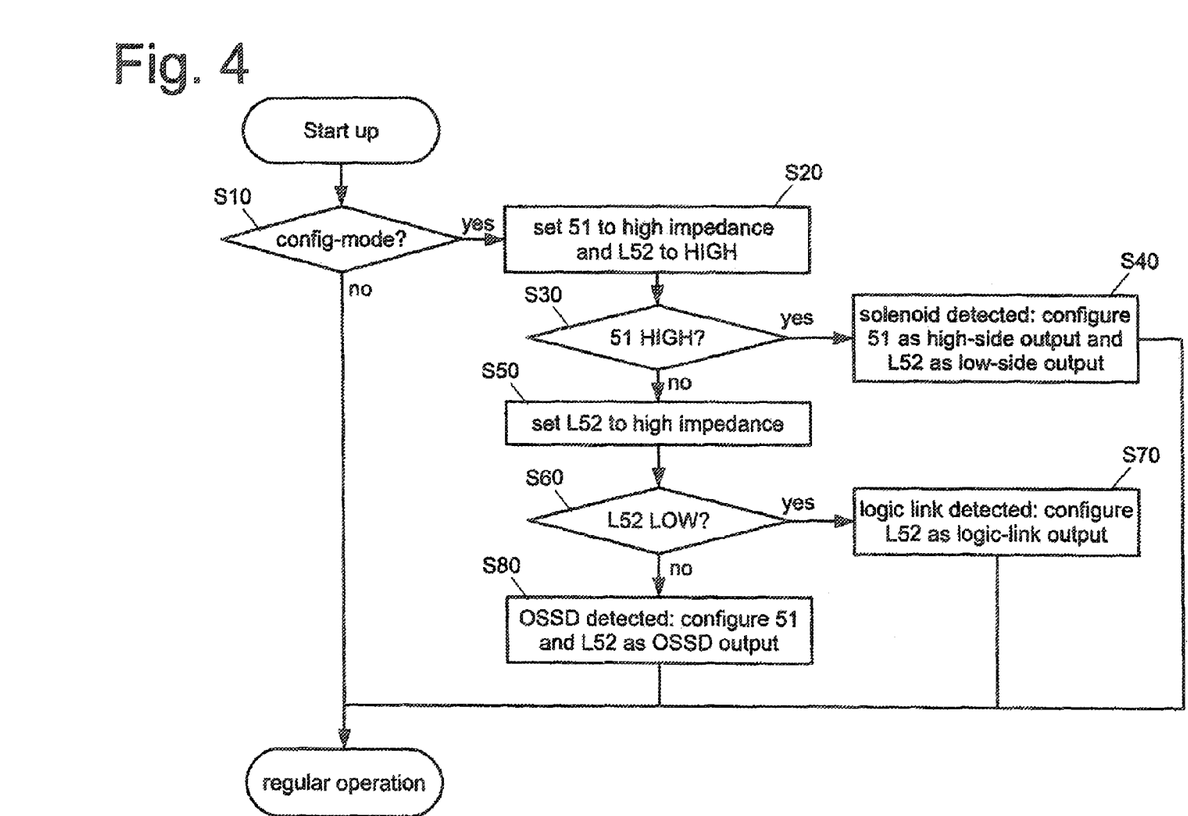
FIG. 4 shows a flow chart of a method for determining a kind of a guard locking device connected to the safety switching device, according to an embodiment of the present invention.

Referring now to FIG. 4 a method for detecting which kind of guard locking device is connected to the safety switching device is described. The method may be performed by the safety processor 110 of the safety switching device 100 shown in FIGS. 1-3, for instance, as part of an initialization processing after start-up of the device.

The method may start with step S10, in which it is determined whether the safety switching device is in a configuration mode or not. The configuration mode may be set, for example, by means of a user-operable setting means, such as a rotary switch, a push button, or any other suitable user interface element. If the configuration mode is not set, the method may end by directly proceeding to a regular operation of the safety switching device on the basis of previously stored configuration information. On the other hand, if the configuration mode is set, the method may proceed to step S20, in which terminal 51 is set to a high impedance state (T1 and T3 off) and terminal L52 is connected to positive supply voltage (T2 on and T4 off). Thus, terminal 51 is configured as an input terminal. In step S30 it is then determined whether terminal 51 carries a logical HIGH signal, i.e., whether there is an external connection that couples terminal 51 to positive supply voltage. The external connection may be formed by solenoid 210 of the guard locking device 200-1 in FIG. 1. If such an external connection is detected ("yes" in S30), the method proceeds to step S40, in which a guard locking device with a solenoid is detected and the operating mode of the safety switching device is set accordingly. Specifically, terminal 51 is configured and operated as a high-side switch and terminal L52 is configured and operated as a low-side switch, as explained above in connection with FIG. 1. After that, the method may end and the safety switching device may commence regular operation on the basis of the set mode of operation and terminal configuration.

If no external connection is detected in step S30, the method proceeds to step S50, in which terminal L52 is set to high impedance (T2 and T4 off). In step S60 it is then determined whether terminal L52 carries a logical LOW signal, i.e., whether there is an external connection that couples terminal L52 to negative supply voltage (ground). If this is found to be the case ("yes" in S60) then a logic link is detected at terminal L52 in step S70 and the operating mode of the safety switching device is set accordingly. Specifically, terminal L52 is configured and operated as a logic link output and terminal 51 is put out of function, as explained above in connection with FIG. 2. After that, the method may end and the safety switching device may commence regular operation on the basis of the set mode of operation and terminal configuration.

On the other hand, if no external connection between terminal L52 and ground is detected ("no" in step S60), a guard locking device with OSSD inputs is assumed and the operating mode is set accordingly in step S80. Specifically, both terminal 51 and terminal L52 are configured and operated as OSSD outputs, as explained above in connection with FIG. 3. After that the method may end and the safety switching device may commence regular operation on the basis of the set mode of operation and terminal configuration.

Although this disclosure describes and illustrates particular steps of the method of FIG. 4 as occurring in a particular order, this disclosure contemplates any suitable steps of the method of FIG. 4 occurring in any suitable order. Moreover, although specific tests are described for detecting the presence of a guard locking device of a certain kind, these tests are by way of example only and different and/or additional tests may be performed as needed. For example, the presence of a logic link may also be tested by checking for an external connection to positive supply voltage, depending on the electrical input characteristics of the guard locking device. In general, any combination of tests may be employed that are suitable for discriminating between two or more different kinds of guard locking device on the basis of an external connectivity between terminals 51 and L52 and positive and/or negative supply voltage. Further, although this disclosure describes and illustrates particular components carrying out particular steps of the method of FIG. 4, this disclosure contemplates any suitable combination of any suitable components carrying out any suitable steps of the method of FIG. 4.

The use of the terms "a" and "an" and "the" and similar references in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A safety switching device for driving a plurality of different kinds of guard locking devices, said safety switching device comprising:
a first terminal and a second terminal for connecting a guard locking device; and
a safety processor adapted to:
control a plurality of drive signals, each drive signal output at one of the first and the second terminal to drive the guard locking device,
detect at least one external electrical connection between at least one of the first terminal and the second terminal and a reference potential,
determine which of the plurality of different kinds of guard locking devices is connected to the at least one of the first terminal and the second terminal, and
control the drive signals depending on the determined kind of guard locking device, wherein said plurality of different kinds of guard locking devices is selected from a first kind, of guard locking device having a solenoid, a second kind of guard locking device having a single channel logic input, and a third kind of guard locking devices having dual channel safety inputs,
wherein the safety processor is adapted to determine:
that the first kind of guard locking device is connected to the first and the second terminal if a connection between the first terminal and the second terminal is detectable,
that the second kind of guard locking device is connected to the second terminal if a connection between the second terminal and the reference potential is detectable, and
that the third kind of guard locking device is connected to the first and the second terminal if neither the connection between the first terminal and the second terminal nor the connection between the second terminal and the reference potential is detectable.

2. The safety switching device of claim 1, wherein each of the first and the second terminals is operable as an input terminal and an output terminal.

3. The safety switching device of claim 1, wherein the safety processor is adapted to:
configure one of the first and the second terminal as an input terminal and the other one of the first and the second terminal as an output terminal,
apply a test pulse at the output terminal, and
detect the test pulse at the input terminal.

4. The safety switching device of claim 1, wherein the safety processor is adapted to:
configure one of the first and the second terminal as an input terminal, and
determine whether a logic level corresponding to the reference potential is detectable at the input terminal.

5. The safety switching device of claim 1, wherein the safety processor is adapted to determine the kind of guard locking device during a configuration phase after start-up of the safety switching device.

6. The safety switching device of claim 1, wherein the safety processor is adapted to control the first terminal as a high-side switch and the second terminal as a low-side switch for driving the first kind of guard locking device.

7. The safety switching device of claim 1, wherein the safety processor is adapted to control the second terminal as a logic output for driving the second kind of guard locking device.

8. The safety switching device of claim 1, wherein the safety processor is adapted to control the first terminal and the second terminal as an output signal switching device (OSSD) output terminal for driving the third kind of guard locking device.

9. The safety switching device of claim 1, further comprising:

a switching circuitry for selectively connecting and disconnecting each of the first terminal and the second terminal to one of a first reference potential and a second reference potential, wherein the safety processor is adapted for controlling the switching circuitry and for monitoring a potential at each of the first terminal and the second terminal.

10. The safety switching device of claim 1, further comprising one or more additional terminals for receiving a switching signal from a safety input device, wherein the safety processor is further adapted for monitoring the switching signal and for driving the guard locking device depending on the switching signal.

11. A method for determining, by a safety switching device having a first terminal and a second terminal for connecting a guard locking device, which out of a plurality of different kinds of guard locking devices is connected to the first terminal and the second terminal, said method comprising the steps of:

probing for an external electrical connections between at least one of the first terminal and the second terminal and a reference potential, and determining the kind of the guard locking device connected to at least one of the first and the second terminal out of the plurality of different kinds of guard locking devices on the basis of a result of the probing step, wherein said plurality of different kinds of guard locking devices is selected from a first kind of guard locking device having a solenoid, a second kind of guard locking device having a single channel logic input, and a third kind of guard locking device having dual channel safety inputs, wherein it is determined that the first kind of guard locking device is connected to the first and the second terminal if a connection between the first terminal and the second terminal is detectable in the probing step, that the second kind of guard locking device is connected to the second terminal if a connection between the second terminal and the reference potential is detectable in the probing step, and that the third kind of guard locking device is connected to the first and the second terminal if neither the connection between the first terminal and the second terminal nor the connection between the second terminal and the reference potential is detectable in the probing step.

12. The method of claim 11, wherein the probing step further comprises the steps of:

configuring one of the first and the second terminal as an input terminal and the other of the first and the second terminal as an output terminal, applying a test pulse at the output terminal, and detecting the test pulse at the input terminal.

13. The method of claim 11, wherein the probing step comprises detecting a connection between one of the first and the second terminal and the reference potential by:

configuring one of the first and the second terminal as an input terminal, and determining whether a logic level corresponding to the reference potential is detectable at the input terminal.

* * * * *

UNITED STATES PATENT AND TRADEMARK OFFICE
CERTIFICATE OF CORRECTION

| | |
|---|---|
| PATENT NO. | : 9,754,752 B2 |
| APPLICATION NO. | : 14/264734 |
| DATED | : September 5, 2017 |
| INVENTOR(S) | : Papenbreer et al. |

Page 1 of 1

It is certified that error appears in the above-identified patent and that said Letters Patent is hereby corrected as shown below:

In the Claims

Claim 1, Column 10, Line 14, Replace "kind," with "kind".

Claim 12, Column 12, Line 3, Add "and" after "inputs,".

Signed and Sealed this
Twenty-first Day of November, 2017

Joseph Matal
*Performing the Functions and Duties of the
Under Secretary of Commerce for Intellectual Property and
Director of the United States Patent and Trademark Office*